US012775260B2

(12) United States Patent
Wolf et al.

(10) Patent No.: US 12,775,260 B2
(45) Date of Patent: Oct. 27, 2026

(54) LIQUID PUMPING SYSTEM WITH PULSE-BASED VOLUME CORRECTION

(71) Applicant: VM SMART LTD, Kfar Maimon (IL)

(72) Inventors: Gilad Wolf, Kfar Maimon (IL); Amatzya Ben Yosef, Mevo Beitar (IL)

(73) Assignee: VM SMART LTD, Kfar Maimom (IL)

( * ) Notice: Subject to any disclaimer, the term of this patent is extended or adjusted under 35 U.S.C. 154(b) by 501 days.

(21) Appl. No.: 18/279,277

(22) PCT Filed: Mar. 3, 2022

(86) PCT No.: PCT/IL2022/050245

§ 371 (c)(1),
(2) Date: Aug. 29, 2023

(87) PCT Pub. No.: WO2022/185321

PCT Pub. Date: Sep. 9, 2022

(65) Prior Publication Data

US 2024/0152104 A1 May 9, 2024

Related U.S. Application Data

(60) Provisional application No. 63/156,417, filed on Mar. 4, 2021.

(51) Int. Cl.

*G05B 19/042* (2006.01)
*A01C 23/00* (2006.01)
*A01C 23/04* (2006.01)

(52) U.S. Cl.

CPC .......... *G05B 19/042* (2013.01); *A01C 23/008* (2013.01); *A01C 23/042* (2013.01); *G05B 2219/2625* (2013.01)

(58) Field of Classification Search

None
See application file for complete search history.

(56) References Cited

U.S. PATENT DOCUMENTS 5,929,314 A * 7/1999 Bergkvist ................ G01F 25/10 73/1.36
6,148,839 A 11/2000 Gonske
(Continued)

FOREIGN PATENT DOCUMENTS

CN 104634409 A 5/2015
JP 2005278415 A 10/2005
JP 2007205309 A 8/2007

OTHER PUBLICATIONS

PCT International Search for International Application No. PCT/IL2022/050245, mailed Jun. 22, 2022, 3pp.
(Continued)

*Primary Examiner* — Ariel Mercado-Vargas
(74) *Attorney, Agent, or Firm* — The Roy Gross Law Firm, LLC; Roy D. Gross

(57) ABSTRACT

The present invention is of an apparatus for providing a precalculated amount of fertilizer to a fertigation system. The system features a fertilizer tank for storing a fertilizer, at least one counter for providing electric pulses associated with an amount of fertilizer expelled out of the tank, a pump for delivering an amount of the fertilizer out of the tank and a controller for commanding the pump to expel the fertilizer out of the tank. The apparatus includes at least one measurement device for measuring a volume of fertilizer in the tank and an electronic liquid control unit in communication with the measurement device. The electronic liquid control unit is configured to communicate with the counter and is further configured to communicate with the controller to actuate the pump for delivering a precise amount of fertilizer according to an output of the electronic liquid control unit.

8 Claims, 10 Drawing Sheets

(56) References Cited

U.S. PATENT DOCUMENTS

| | | | | |
|---|---|---|---|---|
| 2002/0060226 | A1* | 5/2002 | Kameyama | B67D 1/1218 418/206.5 |
| 2017/0008784 | A1* | 1/2017 | Shimpo | C02F 1/686 |
| 2017/0318761 | A1* | 11/2017 | Rainone | B05B 12/04 |
| 2019/0041816 | A1* | 2/2019 | Rivas Sabelle | E03B 1/02 |

OTHER PUBLICATIONS

PCT Written Opinion for International Application No. PCT/IL2022/050245, mailed Jun. 22, 2022, 7pp.

PCT International Preliminary Report on Patentability for International Application No. PCT/IL2022/050245, issued Aug. 29, 2023, 8pp.

* cited by examiner

LIQUID PUMPING SYSTEM WITH PULSE-BASED VOLUME CORRECTION

CROSS REFERENCE TO RELATED APPLICATIONS

This application is a National Phase of PCT Patent Application No. PCT/IL2022/050245 having International filing date of Mar. 3, 2022, which claims the benefit of priority of U.S. Provisional Patent Application No. 63/156,417, filed Mar. 4, 2021, the contents of which are all incorporated herein by reference in their entirety.

FIELD OF THE INVENTION

The present invention relates to a system for dispensing liquid. Moreover, the present invention is of a fertilizer system that is configured to provide an accurate amount of liquid fertilizer to a target area.

BACKGROUND OF THE INVENTION

Fertilizers play an important role in providing nutrients to soil and crops for optimal growth of the crops. There are many different types of methods for applying fertilizers, which include among others broadcasting, foliar application, placement, starter solutions, injection into soil, aerial application, and fertigation.

Fertigation is the application of water-soluble fertilizers through irrigation water. It offers advantages over drop-fertilizing or other conventional methods as it results in accurate placement of nutrients and gives a frequent and even supply of nutrients, which reduces the fluctuation of nutrient concentration in the soil. Control of the alkalinity of the water and soil is also possible using fertigation.

The amount of fertilizer supplied to the irrigation water and the timing of its addition is important for successful fertigation. Available fertigation systems typically include a tank for storing the fertilizer and a pump. The amount of fertilizer pumped out is controlled by a controller which uses a counter to determine when the correct volume of fertilizer has been dispensed from the tank. The counter works using pulses. The counter may be calibrated so that one pulse counted by the counter is equivalent to a certain amount of liquid fertilizer expelled from the tank. For example, one pulse counted by the counter may be equivalent to one liter of liquid fertilizer expelled from the tank or any other suitable calibration, such as but not limited to one pulse equivalent to 0.1 liter, or 10 liters of liquid expelled from the tank. A problem with this type of system is that the counter is inaccurate and one pulse in practice may actually be equal to more or less than the expected calibrated volume, such as one liter expelled from the tank. Inaccuracy in some instances may be up to about forty percent. This results in the amount of fertilizer pumped to the irrigation system not being as intended, which when significantly different has negative consequences, such as a lack of control and incorrect monitoring. Too much or too little fertilizer may damage the crops and earth and lead to lower yields and lower quality produce.

It would therefore be desirable to have a system which provides an accurate and reliable amount of fertilizer. It would be useful if the system could be incorporated into existing fertigation systems. It would further be advantageous if the system could be configured to automatically provide a predetermined amount of fertilizer. The present invention provides such a system, apparatus, and method of use thereof.

SUMMARY

The invention may have several aspects. One aspect is a system for providing liquid. The system may include a storage tank for accommodating a liquid. The system may include at least one measurement device for measuring a volume of the liquid in the liquid tank. The system may include at least one counter through which the liquid is pumped out of the tank. The system may include a pump for expelling the liquid from the tank. The system may include a controller. The system may include an electronic liquid control unit. The electronic liquid control unit may be in communication with the at least one measurement device and the at least one counter. The electronic liquid control unit may further be in communication with the controller to actuate the pump for delivering an amount of the liquid according to an output of the electronic liquid control unit.

In various embodiments of the system, the at least one measurement device may include at least one sensor. The at least one sensor may feature a pressure sensor. The at least one measurement device may include a transmitter for transmitting data from the at least one measurement device to the electronic liquid control unit. The transmitter may be at least one of a cable and a wireless communication means. The at least one counter may include a transmitter for transmitting data to the electronic liquid control unit. The transmitter may be at least one of a cable and a wireless communication means. The liquid may be a liquid fertilizer. The system may further include an irrigation device for delivering the fertilizer to at least one of a crop, earth, field, flowers, or plant. The at least one counter may provide a plurality of spaced apart pulses. The at least one counter may provide a plurality of spaced apart pulses, each pulse of the plurality of pulses having a pulse duration and the electronic liquid control unit may be configured to count the pulses.

In various embodiments of the system, the electronic liquid control unit may analyze the data from the at least one measurement device and the data from the counter and may output data that allows accurately actuating the pump. The electronic liquid control unit may calculate a correction factor calculated by dividing the number of counted pulses by the actual measured volume of liquid pumped out of the tank in the same period the pulses were counted. The data output from the electronic liquid control unit may include a corrected pulse duration calculated by multiplying the measured pulse duration by the correction factor, the corrected pulse duration employed to increase or decrease the duration of a pulse for facilitating a precalculated amount of liquid to be expelled out of the tank per pulse.

The data output from the electronic liquid control unit may include a corrected pulse number employed to provide an additional at least one pulse or removal of at least one pulse. Removal of at least one pulse may result in a greater volume being pumped out and wherein addition of at least one pulse may result in a smaller volume being pumped out. The plurality of pulses may be divided into a plurality of packet of pulses, wherein the number of packets of pulses may be calculated by deducting the actual measured volume pumped out from the tank from the desired volume and defining the number of pulse packets according to the integer value of the result and storing any remaining fraction in an accumulator. Each packet may include a number of pulses, the number calculated by dividing the desired volume to be pumped out of the tank by the integer value of the number of pulse packets. The electronic liquid control unit may include an accumulator for storing the value of the remaining fraction of pulses. The remaining fraction may be divided by the number of pulse packets, the divided amount to be stored at the end of each pulse packet. Accurately actuating the pump may include providing a calculated volume of liquid per counted pulse and providing a calculated volume of fertilizer from the tank to the irrigation device. The controller and the electronic liquid control unit may be integrally disposed within a single device.

In various embodiments of the system, the system may be configured to continuously monitor the amount of fertilizer delivered to a plant. In some embodiments, the system may be configured to monitor in real time the amount of fertilizer delivered to a plant. The system may be for providing fertilizer to a fertigation process wherein the fertilizer is added to irrigation water. The fertilizer may be a liquid fertilizer. The fertilizer may be water soluble.

A further aspect is an apparatus for providing a precalculated amount of fertilizer to a fertigation system. The fertigation system may include a fertilizer tank for accommodating and storing a fertilizer, a pump for delivering an amount of the fertilizer out of the fertilizer tank, at least one counter for providing pulses in a counter and via which the fertilizer is expelled out of the tank to the pump and a controller in communication with the at least one counter and the pump wherein the amount of the fertilizer expelled is according to an output of the controller. The apparatus may include at least one measurement device for measuring a volume of fertilizer in the fertilizer tank. The apparatus may include an electronic liquid control unit in communication with the at least one measurement device. The direct communication between the at least one counter and the controller may be disconnected. The electronic liquid control unit may be configured to communicate with the at least one counter. The electronic liquid control unit may be further configured to communicate with the controller to actuate the pump for delivering an amount of the fertilizer according to an output of the electronic liquid control unit.

In various embodiments of the apparatus the output of the electronic liquid control unit may be at least one of a value of a correction of the number of pulses or the duration of a pulse. The at least one measurement device may be at least one sensor for measuring a volume of a liquid fertilizer in the tank. The apparatus may be accommodated in a box configured for attachment to the fertilizer tank. The box may be attachable to the top of the tank. The box may include at least one extension component, which may be connected at one extremity to the box and at a second extremity to the at least one measurement device. The box may include an opening through which the second extremity of the extension component with the attached at least one measurement device can be threaded through to provide the attached at least one measurement device outside the box and at a position inside the tank suitable for measuring the volume of the fertilizer in the tank.

A still further aspect is a method for precise plant nutrition. The method may include the steps of continuously or at selected time points measuring the amount of fertilizer in a tank, continuously or at selected time points monitoring a fertilizer counter, calculating a corrected value to allow a precise plant nutrition, communicating the corrected value to a controller and actuating a pump according to the corrected value. The method may include delivering a precise amount of fertilizer to the plant, crop or field. In some embodiments, communicating the corrected value to a controller comprises communicating pulses. In some embodiments, communicating pulses comprises communicating less pulses per a certain time period. In some embodiments, communicating pulses comprises communicating more pulses per a certain time period. In some embodiments, communicating pulses comprises communicating pulses with a shorter or longer pulse duration. In various embodiments of the method, the method features providing the apparatus of the present invention as herein described. The corrected value may be a corrected electric pulse duration or a corrected number of pulses. The measuring the amount of fertilizer in a tank may include measuring the volume of fertilizer with the at least one measurement device and communicating the amount to the electronic liquid control unit. The monitoring the counter may include communicating the number of pulses from the at least one counter to the electronic liquid control unit and counting by the electronic liquid control unit of the number of pulses from the at least one counter. The calculating a corrected value for actuating a fertilizer pump may include calculating a correction factor. Calculating a correction factor may include measuring the initial tank volume at the start of a time period to provide the initial tank volume value. Calculating a correction factor may include measuring the final tank volume at the end of a time period to provide the final tank volume. Calculating a correction factor may include measuring the number of pulses from the counter in the time period to provide the pulse number. Calculating a correction factor may include calculating the actual volume dispensed by finding the difference in the final tank volume from the initial volume. Calculating a correction factor may include calculating the actual pulse volume by dividing the actual volume dispensed by the pulse number and comparing the theoretical pulse volume with the actual pulse volume. Calculating a correction factor may include calculating a correction factor by dividing the pulse number by the actual volume dispensed. The method may further include providing a corrected pulse duration to the controller. Providing a corrected pulse duration may feature measuring the duration of a pulse and calculating the corrected pulse duration by multiplying the correction factor by the duration of a pulse. The method may further include providing a corrected pulse number to the controller. Providing a corrected pulse number may include calculating the number of pulse packets by deducting the actual measured volume pumped out from the tank from the desired volume. Providing a corrected pulse number may include defining the number of pulse packets according to the integer value of the result and storing any remaining fraction in an accumulator. Providing a corrected pulse number may include calculating the number of pulses per packet by dividing the desired volume to be pumped out of the tank by the integer value of the number of pulse packets. Providing a corrected pulse number may include comparing the theoretical volume per pulse with the actual volume per pulse. Providing a corrected pulse number may include removing one pulse from every packet when the actual volume per pulse is less than the theoretical volume per pulse. Providing a corrected pulse number may include adding one pulse to every packet when the actual volume per pulse is more than the theoretical volume per pulse. Storing any remaining fraction in an accumulator may include dividing the fraction by the number of pulse packets and removing or adding a pulse when the accumulated fraction reaches 1.

An aspect is a method of assembling a system for pumping an accurate volume of a liquid from a tank. The method may include providing the apparatus of the present invention as herein described. The method may include attaching the apparatus to a system. The system may include a fertilizer tank for accommodating and storing a fertilizer, at least one counter for providing pulses in a counter and through which the fertilizer is pumped out of the tank, a pump for delivering an amount of the fertilizer out of the fertilizer tank and a controller in communication with the at least one counter and the pump. The amount of the fertilizer expelled may be according to an output of the controller. The method may include attaching the box to the top of the tank and placing the at least one measurement device in the tank, positioned about the bottom of the tank. The method may include disconnecting any direct connection between the counter and the controller. The method may include connecting the counter to the electronic liquid control unit. The method may include connecting the electronic liquid control unit to the controller.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
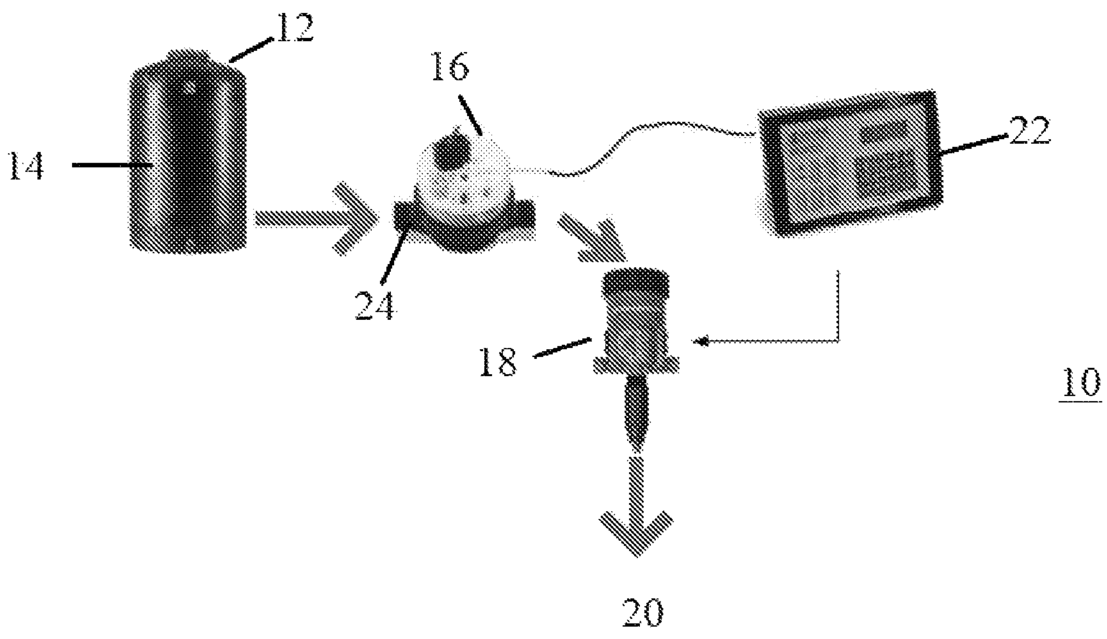
FIG. 1 shows a typical prior art fertigation system.

It should be appreciated that for simplicity and clarity of illustration, elements shown in the figures have not necessarily been drawn to scale. For example, the dimensions of some of the elements are exaggerated relative to each other for clarity. Further, where considered appropriate, reference numerals have been repeated among the figures to indicate corresponding elements.

DETAILED DESCRIPTION

It is understood that the invention is not limited to the particular methodology, systems, devices, apparatus, items or products etc., described herein, as these may vary as the skilled artisan will recognize. It is also to be understood that the terminology used herein is used for the purpose of describing particular embodiments only and is not intended to limit the scope of the invention. The following exemplary embodiments may be described in the context of exemplary fertigation devices for ease of description and understanding. However, the invention is not limited to the specifically described products and methods and may be adapted to various applications without departing from the overall scope of the invention.

The present invention pertains to systems and methods for controlling, monitoring and delivering accurate amounts of a volume of liquid. The present invention is directed to systems and methods for pumping and/or measuring a liquid using a counter. In one aspect the present invention relates to fertigation systems and methods for delivering accurate amounts of a fertilizer for crop fertigation and the control and monitoring thereof. In an aspect the present invention is of an apparatus for providing a precalculated amount of a fertilizer to a fertilization system. Another aspect is of a method of attaching such an apparatus to a fertilization system. In an additional aspect the present invention is of a system for fertilization which includes apparatus for providing a precalculated amount of a fertilizer to the fertigation system. In a further aspect, the present invention provides methods of providing precise plant nutrition. Furthermore, the present invention is of a system for alerting a user to unscheduled loss of a stored liquid, such as a fertilizer, or damage to the storage tank.

The apparatus, system and methods of the present invention have many advantages. The invention ensures that the crops or earth are irrigated with an amount of fertilizer, which has been calculated for optimal quality and yield of the crops and earth. The invention is configured for providing reliable and reproduceable amounts of fertilizer. The invention also provides a way of ensuring that fertilizer is not inadvertently wasted by imprecise use of too much fertilizer. The invention may also enable the use of an attachable apparatus with an existing fertigation system, which lowers the cost of such an improved system and is environmentally favorable. The same apparatus may also facilitate alerting a user to an unscheduled loss of fertilizer, which may result from a leak or theft.

As used herein the term ‘pulse’ may include, but is not limited to an electrical signal which has a start, a finish and/or a duration. The signal may be defined to correspond to a volume of liquid in a pipe of a counter. The pulse may be modified. The pulse may be formed or inputted in one component and modified and/or outputted in another component. In some embodiments, the input pulse may be a pulse from the counter transmitted to the electronic liquid control unit. The output pulse may be the modified pulse corrected by the electronic liquid control unit and transmitted to the controller. In a system wherein the pulses are not modified the input pulse may be the same as the output pulse. In a system wherein the pulses are not modified the number of input pulses may be the same as the number of output pulses. In a system wherein the pulses are not modified the duration of an input pulse may be the same as the duration of an output pulse.

As used herein the term ‘pulse packet’ may include, but is not limited to a division of the total number of pulses into segments. Each segment may include the same number of pulses or a different number of pulses.

As used herein the term ‘modulate’ may include, but is not limited to changing or modifying an original state of a parameter by for example, but not limited to, adding, deleting, increasing number of, decreasing number of, shortening, lengthening and any combination thereof.

As used herein the term 'accumulator' may include, but is not limited to any suitable register in an electronic liquid control unit which stores intermediate results or values.

As used herein the term 'connection' may include, but is not limited to direct and indirect attachment.

As used herein the term 'inlet' may include, but is not limited to a means of entry. The term may include any suitable means of entry, such as, but not limited to vents, ducts, pipes, flues and openings.

As used herein the term 'outlet' may include, but is not limited to a means of exit. The term may include an opening or passage configured for letting something out. The term may include vents, pipes, ducts and exits for expelling something.

As used herein the terms 'a' and 'an' may mean 'one' or 'more than one'.

All ranges disclosed herein include the endpoints. The use of the term "or" shall be construed to mean "and/or" unless the specific context indicates otherwise.

Each of the following terms: 'includes', 'including', 'has', 'having', 'comprises', and 'comprising', and, their linguistic, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The term 'consisting essentially of' as used herein means limited to the specified elements and those that do not materially affect the basic and novel characteristic(s) of the claimed invention.

Each of the phrases 'consisting of' and 'consists of', as used herein, means 'including and limited to'.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably.

The term 'about', in some embodiments, refers to ±30% of the stated numerical value. In further embodiments, the term refers to ±20% of the stated numerical value. In yet further embodiments, the term refers to ±10% of the stated numerical value.

The principles and operation of a system and apparatus, such as a fertilization system and apparatus for dispensing of accurate amounts of a fertilizer, as well as methods of use thereof according to the present invention may be better understood with reference to the figures. The figures show non-limiting aspects of the present invention.

Reference is now made to FIG. 1 which illustrates a typical prior art fertigation system 10. The system 10 includes a tank 12, which is configured to contain and store a fertilizer 14, a counter 16, which can be used for measuring the amount of fertilizer 14 coming out of the fertilizer tank 12, a pump 18 for pumping out fertilizer 14 from the tank 12 to an irrigation system 20 and a controller 22 for commanding and controlling the pump 18 to pump the fertilizer 14 out of the tank 12. When the fertigation process is in progress, the liquid fertilizer 14 may be dispensed from an outlet in the tank 12 and may pass through the counter 16 and through the pump 18 to the irrigation system 20 configured to fertilize and irrigate a land destination, such as, but not limited to a crop. The counter 16 may include electronics to provide spaced apart electrical pulses. The time between pulses may be even or may not be uniform. The counter 16 may include a pipe 24 or other suitable distribution channel through which the liquid 14 expelled out of the tank 12 can pass through. The counter 16 may be connected to the controller 22 by any suitable connection, such as but not limited to a wired or unwired connection. The counter 16 may include a transmitter (not shown) to transmit data to the controller 22. The transmitter may be wired or wireless. The counter 16 provides electrical pulses in the counter 16, which is correlated with the volume of liquid 14 pumped through a pipe 24 of the counter 16. The counter 16 may be calibrated in any suitable way. In some embodiments the counter 16 is calibrated so that one pulse corresponds to one liter of liquid 14 passing through it. The counter 16 may include means, such as the transmitter, to transmit the electrical pulses to the controller 22. The controller 22 may be configured to count the pulses. The counter 16 is typically inaccurate, resulting in the controller 22 determining an incorrect value of the volume of fertilizer 14 being pumped out. The value can deviate up to about 40% or higher than the real volume. Accordingly, the controller 22 which commands the pump 18 to deliver an amount of fertilizer 14 from the tank 12 to a destination, such as but not limited to a crop field, transmits erroneous data to the pump 18. As such, the pump 18 pumps out of the tank 12 a quantity of fertilizer 14, which is less or more than required.

Figure 2:
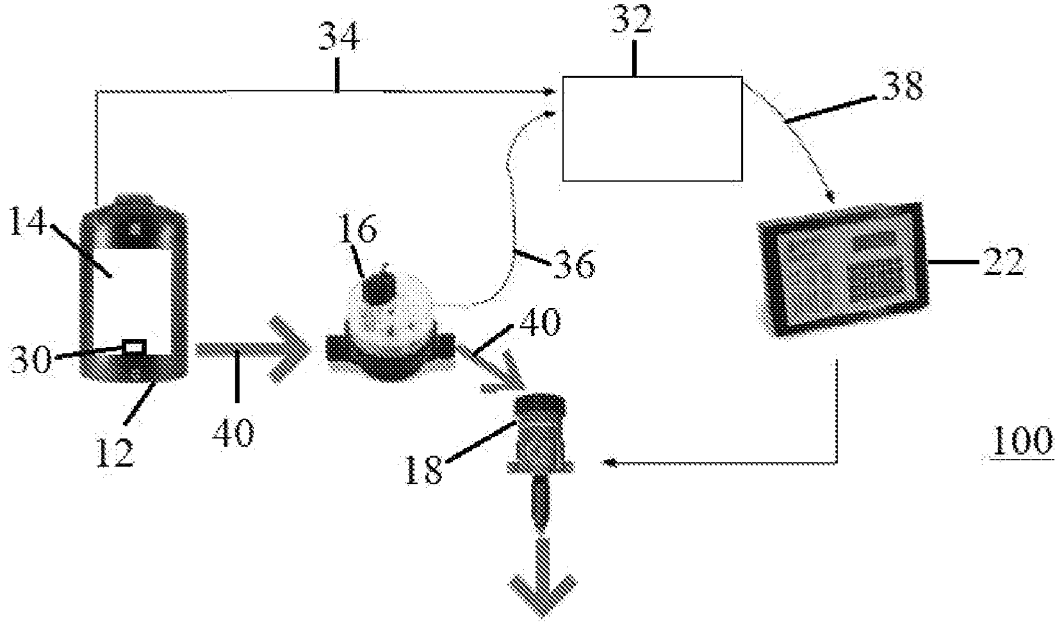
FIG. 2 shows an exemplary system for accurate fertigation according to an aspect of the present invention.

A fertilization system 100 of the present invention is shown schematically in FIG. 2. Similarly, to FIG. 1, the system includes a tank 12 for holding a liquid, such as, but not limited to a fertilizer 14, at least one counter 16, a pump 18 and a controller 22. The tank 12 is configured to hold a liquid fertilizer 14. The liquid fertilizer 14 may be any suitable water-soluble fertilizer. The system 100 further includes one or more fluid measurement devices 30 and an electronic liquid control unit 32.

The at least one measuring device 30 may be configured for real time measurement of parameters relating to the fertilizer 14. The at least one measuring device 30 may be configured for continuous measurement of the volume of the fertilizer 14 in the tank 12. In some embodiments, the at least one measuring device may be configured for non-continuous determination of the volume of the fertilizer 14 in the tank 12. Non-continuous determination may be measurement at any suitable timed intervals. The at least one measurement device 30 may be configured to only measure at least one parameter during the fertigation process. In some embodiments, the at least one measurement device 30 may be used to also measure at least one parameter after the pump 18 has been stopped and no more liquid 14 is being pumped out. The volume may be the total volume of fertilizer 14 in the tank 12.

Non-limiting examples of suitable measuring devices 30 include sensors, such as pressure sensors, optical sensors, magnetic sensors, capacitive sensors and ultrasonic sensors. In one or more embodiments, the sensor 30 may be a pressure sensor which can determine liquid volume by for example measuring pressure which is converted to the height of the liquid and then to the volume. In one or more embodiments, the sensor 30 may be a sensor 30 for measuring a specific gravity. In one or more embodiments, the sensor 30 may be two sensors such as a pressure sensor and a specific gravity sensor. In an exemplary embodiment, air pressure or fluid pressure within a vessel, such as the storage tank 12, can be translated by calculation to fluid quantity. The one or more measurement devices 30 may be configured to communicate with the electronic liquid control unit 32. The one or more measurement devices 30 may transmit data 34 to the electronic liquid control unit 32, such as but not limited to the measured volume of liquid, such as a fertilizer 14 in the tank 12. In one or more embodiments, the sensor 30 may include a transmitter unit for communicating the measured fertilizer volume. The sensor 30 may transmit the data 34 to a local antenna, which may be coupled to the electronic liquid control unit 32. In one or more embodiments, a transmitter unit may be wired or wirelessly connected to the electronic liquid control unit 32.

The electronic liquid control unit 32 may be any suitable electronic liquid control unit 32. The electronic liquid control unit 32 may be configured to provide a correction to the pulses it receives from the counter 16, in order to maintain an accurate volume of liquid being pumped out of a liquid storage container 12. The electronic liquid control unit may include any suitable components, such as, but not limited to at least one of a control board, at least one electronic chip, a central processing unit (CPU) and an antenna. The electronic liquid control unit 32 may be configured to receive data 36 from the counter 16. The data 36 may relate to the liquid, such as a fertilizer 14. The data 36 may include the pulses from the counter 16, which may be counted by the electronic liquid control unit 32. The number of measured pulses may relate to the quantity of fertilizer 14 pumped out of the tank 12. The counter 16 may be configured to transmit the data 36 to the electronic liquid control unit 32, which may be by a wired or wireless connection. The counter 16 may use the same transmitter, which in the absence of the system 100 of the present invention is configured for communication of the counter 16 with the controller 22. The counter 16 may be configured to provide pulses when there is liquid flowing in the pipe of the counter 16. As such, the electronic liquid control unit 32 may count pulses, such as but not limited to when the pump 18 is pumping out liquid from the tank 12 or when there is a leak.

The electronic liquid control unit 32 may be configured to be in communication with a plurality of components of the system 100. The electronic liquid control unit 32 may be configured to be in communication with the counter 16, the at least one measurement device 30 and the controller 22. The electronic liquid control unit 32 may be coupled to these components in any suitable way in order to actuate the pump 18 for delivering an amount of the fertilizer 14 according to an output 38 of the electronic liquid control unit 32. In one embodiment, the controller 22 can include the electronic liquid control unit and the software of the present invention in a single unit.

The electronic liquid control unit 32 may be connected to the components and units of the fertigation system using any suitable connection means, which may be wired or wireless. In some embodiments, wherein the electronic liquid control unit of the present invention is being added to a preexisting fertigation system (such as fertigation system 10), a connection between the counter 16 and the controller 22 may be cut and the counter 16 may instead be connected to the controller 22 via the electronic liquid control unit 32. The counter 16 may be connected to the electronic liquid control unit 32 via the same wire used to connect the counter 16 to the controller 22, or with another connection means. The electronic liquid control unit 32 may be similarly connected to the controller 22 by wired or wireless means.

As previously disclosed, the counter 16 may be calibrated. The counter 16 may be purchased calibrated for providing one pulse per different volumes of liquid. In some embodiments, the counter 16 is calibrated so that it provides, for example, one pulse per liter of liquid 14 pumped through 40 to the counter 16. However, in practice one pulse may not be equivalent to one liter of liquid 14 pumped out. The number of pulses from the counter 16 which are counted by the electronic control unit 32 may give inaccurate data relating to the volume of liquid 14 being pumped out 40. As such, the electronic liquid control unit 32 may be configured to provide a correction to the controller 22 in order to facilitate the pump 18 pumping out and supplying the correct volume of liquid 14, such as liquid fertilizer. The correction may result from applying an output from the electronic liquid control unit to produce a corrected pulse number and/or pulse duration, which may be transmitted to the controller 22. An output 38 from the electronic liquid control unit 32 may include a correction factor. Using a set of equations and algorithms of the present invention with the data from the one or more measurement devices 30 and the counter 16, the electronic liquid control unit 32 may calculate a correction factor. The correction factor may be used in different ways to facilitate corrected data 38 for pumping of the right amount of fertilizer 14 and fertigation with an accuracy of up to about 100%. This corrected data 38, which may be a modified number of pulses, and/or a modified pulse duration, may be transmitted to the controller 22 which may in turn command the pump 18 to deliver an amount of fertilizer 14 from the tank 12. The correction for providing the right amount of fertilizer 14 may be by for example, but not limited to, changing the duration of the electric pulses, or changing the number of pulses.

Figure 3:
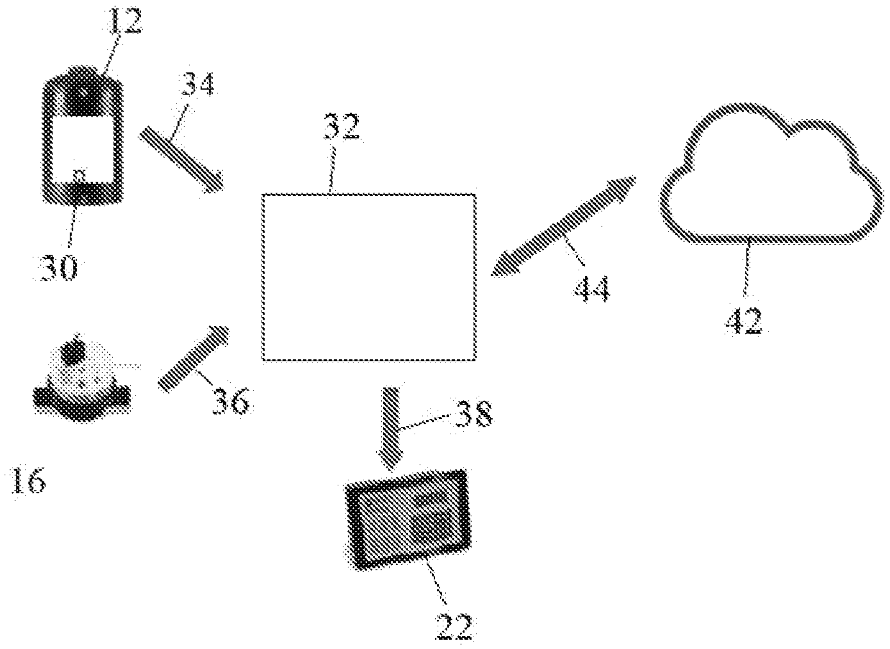
FIG. 3 shows exemplary communication channels of an exemplary electronic liquid control unit according to an aspect of the present invention.

In order to provide the correction, the electronic liquid control unit 32 may be configured to be in communication with a plurality of components or units of the system 100 for facilitating a flow of data between the components as herein described. FIG. 3 illustrates an exemplary data flow between units in the system 100 of the present invention. The tank 12 may include the at least one measurement device 30, such as one or more sensors that can provide real time and continuous data regarding the quantity of fertilizer in the tank 12.

The at least one measurement device 30 such as a sensor communicates this data to the electronic liquid control unit 32.

The at least one measurement device 30, such as a sensor may include a transmitter unit for communicating the measured fertilizer volume to a local antenna, which may be coupled to the electronic liquid control unit 32. In one or more embodiments, the transmitter unit may transmit the measured data to a local antenna (not shown in the figure) and from there to a cloud-based server 42 which can communicate with a smartphone, or a computer storage device, or any other cloud-based servers. The measured data may be transmitted to any remote computing device having a software and/or algorithm for processing the measured data and providing an output of the quantity of the measured fertilizer.

The counter 16 transmits data 36 to the electronic liquid control unit 32, the data including the pulses. The number of pulses relates to the volume of fertilizer 14 pumped out of the tank 12 and which passes through the counter 16. As described, the counter 16 may be inaccurate. The electronic liquid control unit 32 counts the pulses and calculates a correction factor for providing a corrected value of the volume of fertilizer 14 pumped out for fertigation. The electronic liquid control unit 32 may transmit the processed corrected data 38, which may feature a corrected number of pulses and/or duration of pulses, to the controller 22, the controller which communicates with the pump 18 to deliver a corrected output of a fertilizer volume to a destination such as a crop field. In an embodiment wherein the counter 16 is found to be accurate the correction factor may be one, such that the output of fertilizer would be unchanged. The electronic liquid control unit 32 may communicate partial or all data 44 through a cloud-based server 42 or may perform the entire data processing locally.

Figure 4:
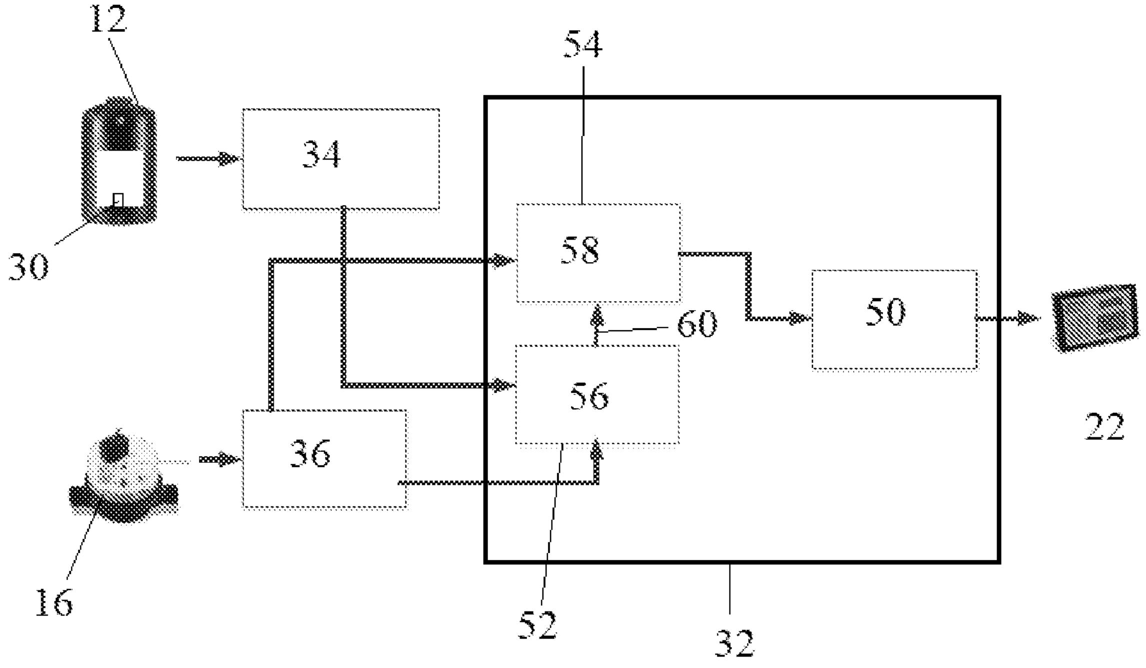
FIG. 4 shows the data flow between units in an exemplary fertigation system, in accordance with an aspect of the present invention.

The present invention includes a plurality of ways for providing a corrected output of fertilizer that is pumped out of the tank 12. FIG. 4 shows a flow chart illustrating an overview of the data flow between units in the system 100 for facilitating a corrected output of liquid, such as fertilizer. Data 34, which may include tank sensor measurements from the one or more measurement devices 30, such as sensors, which are positioned in a suitable position in the liquid storage tank 12, as well as data 36 from the counter 16, may be transmitted to the electronic liquid control unit 32. The electronic liquid control unit 32 may employ this data to calculate a corrected value 50 of a parameter to be used to ensure the correct volume of fertilizer is supplied in the fertigation process. The parameter may be a parameter relating to the pulse. The parameter may be, but is not limited to the pulse duration and the number of pulses. The corrected value such as the modified pulse duration and/or pulse number may be transmitted by the electronic liquid control unit 32 to the controller 22 for actuating the pump according to the modified parameter. The correction may be calculated using at least one process, such as a learning process 52 and a correction process 54. The correction provided by the electronic liquid control unit 32 may be determined using a plurality of algorithms, such as a learning algorithm 56 and a correction algorithm 58.

The learning process 52 may be a method of monitoring and learning the accuracy of the volume of liquid supplied by the system 100 of the present invention. The learning process 52 may calculate a correction factor 60. The learning process 52 may employ an algorithm 56 to calculate the correction factor 60. The learning algorithm 56 may use a plurality of measurements in the correction factor calculation such as, but not limited to data 34 regarding the tank's initial volume of fertilizer, data 34 regarding the tank's final volume of fertilizer and data 36 regarding the number of pulses measured by the counter 16. In some embodiments, the pump may be turned on and started. The number of pulses may be determined. The counter 16 may start counting the counter pulses while the liquid is pumped through the counter 16. When the pump is stopped, the counter 16 may stop counting pulses. The volume of fertilizer in the tank 12 may be measured in any suitable period of time. The difference in the volume at the start of the time period and at the end of the time period is the value of the actual measured volume of liquid pumped out. The volume may be measured multiple times during the fertilizer pumping process. Suitable periods of time may include measuring the volume before the pump 18 is started and measuring the volume when the pump 18 is stopped. In some embodiments a suitable period of time may be any suitable time period, which may be random or fixed by a user and may be without stopping the pumping and this parameter or parameters may be provided to the system of the present invention 100, such as during set up. In some embodiments, the correction factor 60 may be calculated by dividing the number of pulses 36 by the actual measured volume 34 of liquid pumped out.

The correction process 54 may be a method of using the correction factor 60 determined from the learning process 52 to provide a correction 50 of a parameter of the fertilizer pumping process. The parameter may be any suitable parameter. The parameters may be related to the pulses of the counter. Non limiting examples of suitable parameters include the pulse duration and the pulse number. The correction process 54 may be used to provide a corrected value 50 of a parameter. The correction process 54 may employ an algorithm 58 to calculate the corrected value 50 of the parameter. The correction algorithm 58 may use the measurement of the pulse duration and the correction factor 60. The pulse duration may be measured by any suitable method, such as, but not limited to by a timer in the electronic liquid control unit. The corrected parameter 50 may be calculated by multiplying the measured pulse duration by the correction factor 60. The corrected pulse duration if longer than the prior measured pulse duration may provide more fertilizer pumped out per pulse and a pulse duration of less than the prior measured pulse duration may facilitate less fertilizer being pumped out per pulse.

In some embodiments, wherein the correction 50 calculated by the electronic liquid control unit 32 is based on pulse count, the correction process 54 may include at least one alternative step. The correction factor 60 may be determined in a learning process 52 as described hereinabove. In contrast to the pulse duration modulation method, in the correction process 54 of the pulse number modulation method, a pulse packet may be determined according to the correction factor. Depending on the value of the correction factor 60, amendment of the pulses may be at least one in addition to at least one pulse in a packet, removal of at least one pulse from a packet, addition of at least one pulse between packets and removal of at least one pulse between packets, as required. The addition of a pulse provides an end volume which is less than the uncorrected volume pumped out of the tank and is used when it is determined that too much fertilizer is being pumped out and less is needed according to the value of the correction factor. When the correction factor is greater than 1, pulses may be removed and when the correction factor is less than 1, pulses may be added. When a pulse is added to a pulse packet the same volume passes through the counter, but the number of pulses counted is more, resulting in less fertilizer being pumped out. in the for example one hundred pulses being counted than in the uncorrected system. The removal of a pulse provides an end volume after the pulses, such as one hundred pulses, which is more than the uncorrected volume pumped out from the tank and is used when it is determined that more volume pumped out is needed according to the value of the correction factor. When a pulse is removed the same volume as when the pulse existed passes through the counter, but the pulse is missing and so is not included in the total number of pulses counted. As such more volume is pumped out by removal of the pulses. Addition or removal of pulses compensates for the inaccurate counter and provides accurate volumes of liquid, which are pumped out of the tank and where the volumes may be predetermined. In the method which uses addition or removal of pulses, the pulse duration may not be modified, but may stay the same.

In the correction process 54 of the pulse number modulation method, the number of pulse packets and the length of a pulse packet may be determined. In one non limiting example, the number of pulse packets is calculated as follows. The desired volume of liquid to be pumped out of the tank is divided by the correction factor to give the actual amount of liquid which has been pumped out with 100 pulses. The actual measured volume is deducted from the desired volume to give the number of pulse packets. If the value of the number of pulse packets is not a whole number, the fraction part of the value is removed and the fraction part is divided by the number of pulse packets. The fraction divided by the number of packets is added to a special accumulator after each packet. When the accumulated fraction is greater than the number one, the pulse is removed or added according to the correction factor value and the accumulator is cleared. In some examples wherein the accumulated fraction has not reached an integer after accumulation with each packet, the fraction can be added to the next cycle in a compensation stage. To calculate the packet length (the number of pulses in a packet), the desired volume of liquid to be pumped out of the tank is divided by the whole number part of the calculated number of packets. In an example where the packet length is 4, and the correction factor is greater than 1, every fourth pulse is removed. In addition, when the fraction stored in an accumulator reaches one, a pulse is removed and the accumulator is cleared. In an example, wherein the correction factor is less than 1 and the packet length is 4, a pulse may be added to every packet, so that there will be five pulses per packet. In addition, when the fraction stored in an accumulator reaches one, an additional pulse is added and the accumulator is cleared.

Figure 5:
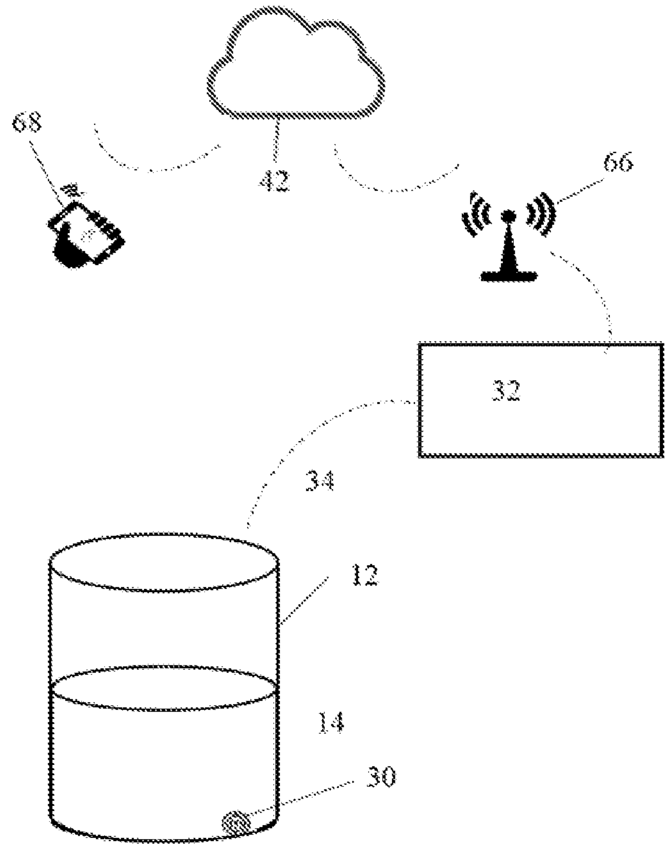
FIG. 5 shows the data flow between units in an exemplary system and a remote device according to an aspect of the present invention.

The data from the system and apparatus of the present invention may be transmitted to a remote computing device. FIG. 5 shows the data flow between the units in an exemplary system to a remote device according to an aspect of the present invention. Fertilizer tanks used in agriculture, such as in fields of crops, are in many cases located remotely from the agricultural location where the fertilizer is destined to go. The farmer or other user who is located at a distance from the system of the present invention needs to be aware of factors relating to the fertigation process. It is advantageous that he can be alerted to situations and parameters relating to the supply of the fertilizer. Hence, there is a need for providing systems, methods and devices which would allow remote communication regarding the amount and other factors of a substance, such as a fertilizer within the storage containers. It would also be desirable if a user via a remote computing device can provide input to the system and change parameters and values of the system with the device.

As can be seen in FIG. 5, an exemplary measuring device 30 is shown when disposed on the bottom surface of the tank 12. The electronic liquid control unit 32 communicates with the measuring device 30, such as a sensor 30. The sensor 30 may communicate 34 with the electronic liquid control unit 32 via a wired or wireless communication channel. Optionally, the sensor 30 communicates directly with a local antenna 66 which communicates with a cloud-based server 42 that communicates with the electronic liquid control unit 32. The analyzed data may be transmitted to at least one remote computing device 68 such as a smart phone 68 or any other computer or suitable handheld device, including but not limited to an iPad and a smart watch. In some embodiments, the transmission may be a two way communication, whereby the remote computing device is configured so that it can control and change parameters relating to the system.

Figure 6A:
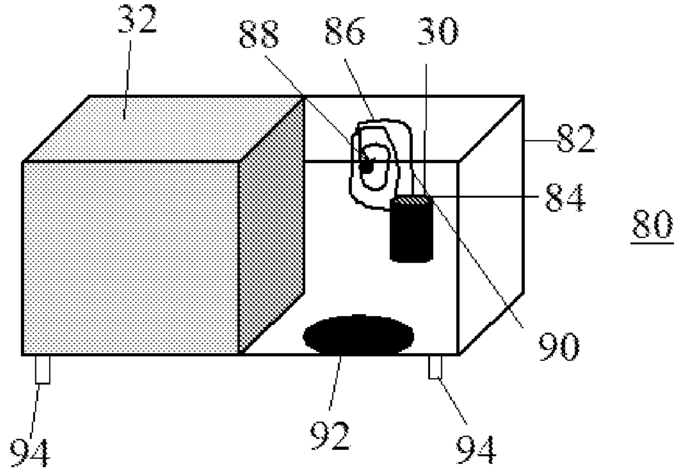
FIGS. 6*a* and 6*b* show an exemplary connectable apparatus for providing accurate volumes of liquid according to an aspect of the present invention.

The present invention provides an apparatus for facilitating pumping out an exact predetermined volume of a fluid from a storage unit. It is to be understood that the herein invention can be utilized for any suitable application associated with monitoring and improving the economy of fluid substances and the distribution thereof and is not limited to fertilizers. FIG. 6*a* shows an exemplary connectable apparatus 80 for providing accurate volumes of a liquid according to an aspect of the present invention. In one non-limiting example the apparatus 80 may be used with a fertilizer system for pumping out a liquid fertilizer from a tank in a predetermined and reliable amount. The apparatus 80 may be built as part of the entire or parts of a fertigation system or other system which pumps out volumes of a liquid for any suitable purpose, wherein control of the exact amount of the liquid pumped out is important. In some embodiments, the apparatus 80 for facilitating pumping out an exact, accurate volume of a fluid from a storage unit, the volume which may be predetermined, is connectable and can be coupled in any suitable way to a preexisting system, such as a fertigation system. In some embodiments, the apparatus of the present invention may be connected to a prior art fertigation system, such as, but not limited to the one shown schematically in FIG. 1.

The apparatus 80 may include at least one measurement device 30, such as but not limited to sensors 30 as previously described. The at least one measurement device 30 is configured for measuring and monitoring the volume of liquid in the storage tank such as a liquid fertilizer. The one or more measurement devices 30 may also be configured to transmit data to the electronic liquid control unit 32. The data may include the value of the measured volume of liquid, such as fertilizer, in the tank. In one or more embodiments, the sensor 30 may include a transmitter unit for communicating the measured fertilizer volume to a local antenna, which may be coupled to the electronic liquid control unit 32, or which may communicate in any suitable way with the electronic liquid control unit 32. The transmitter unit may be wired or wirelessly connected to the electronic liquid control unit 32. To avoid repetition other details of the at least one measurement device 30 will not be described again.

The apparatus 80 may include at least one electronic liquid control unit 32. The electronic liquid control unit 32 may be as previously described herein and to avoid repetition will not be described again. The electronic liquid control unit 32 may include a command box, a board card, a power source, a communication module and an antenna. The electronic liquid control unit may include a timer and a clock. In one or more embodiments, the electronic liquid control unit 32 includes at least one software application configured to receive the data. The software application may be further configured to analyze the data and/or display the data and/or provide an analysis output of the data. In one or more embodiments, the electronic liquid control unit 32 includes a software application configured to receive the data and/or transmit it to a cloud-based server, which may be a web-based software application enabling a subject to display and interact with information located on a web page. In one or more embodiments, the software application includes at least one analysis algorithm for calculating and/or analyzing parameters of the obtained measurements.

As can be seen in FIG. 6*a*, the components of the apparatus 80 may be accommodated in a suitable container 82. In one embodiment, the container 82 may be a box. The box 82 may be made from a material, such as but not limited to polycarbonate. The container 82 may be configured from a material which does not interfere with communication between the units and components in the system as previously described. The container 82 may be made from a material which is resistant to the fertilizer. The container 82 may be configured as a sealed enclosure. The electronic liquid control unit 32 may be connected to the container 82 in any suitable way, such as using screws to screw it to the container. The at least one measuring device 30, such as a sensor may be accommodated in the container 82. The attachment of the at least one measuring device 30 to the container 82 may be configured so that the measuring device 30 can be anchored to the box 82 at one end 84 in such a way as to be freely moveable out of the box 82 whilst being indirectly attached to the box 82. In some embodiments, the box 82 includes an extension component 86. The extension component 86 may be connected at one extremity 88 to the box 82 and the second extremity 90 may be connected to the at least one measurement device 30. The length of the extension component 86 may be suitable for positioning the connected at least one measuring device 30 at a suitable position in the tank 12 of a system, such as a fertigation system. The extension component 86 may extend so that the at least one measuring device 30 may be placed on the floor or adjacent to the bottom of the storage container 12, such as a tank. A non-limiting example of a suitable extension component 86 is a cable, such as an electrical cable. In some embodiments, the box 82 may include an opening 92, such as a hole. The non anchored end 90 of the extension component 86 with the attached at least one measurement device 30 may be thread through the opening 92 to provide the attached at least one measurement device 30 at a position inside the tank 12 suitable for measuring the volume of liquid 14 in the tank 12. A user may thread the at least one measurement device 30 through the opening 92 when attaching the apparatus 80 to a system which may be an existing system and setting up the updated system. The opening 92 may be constructed from a suitable material so that when the at least one measurement device 30 is thread through the opening 92, the opening 92 is sufficiently closed to provide a substantially sealed container 82.

In an embodiment wherein the apparatus 80 includes more than one measurement device 30, the more than one measurement device 30 may be attached to the same extension component 86. In some embodiments wherein the apparatus 80 includes more than one measurement device 30, each measurement device may be attached to a separate length of the extension component 86. Each measurement device 30 may be attached to a different size or length, or the same size or length of the extension component 86 for correct positioning of the measurement device in the tank 12 according to what the at least one measurement device 30 is configured to measure.

In some embodiments, the at least one measurement device 30 may not be anchored to the apparatus container 82. In such an embodiment, the at least one measurement device 30 may be fully removable and freely positioned by a user in the tank 12 of a system, without any physical connection to the apparatus container.

The apparatus container such as a box 82 may include suitable attachment means 94 for attaching the unit to a system. Suitable attachment means include bolts, screws, clips and magnets.

Figure 6B:
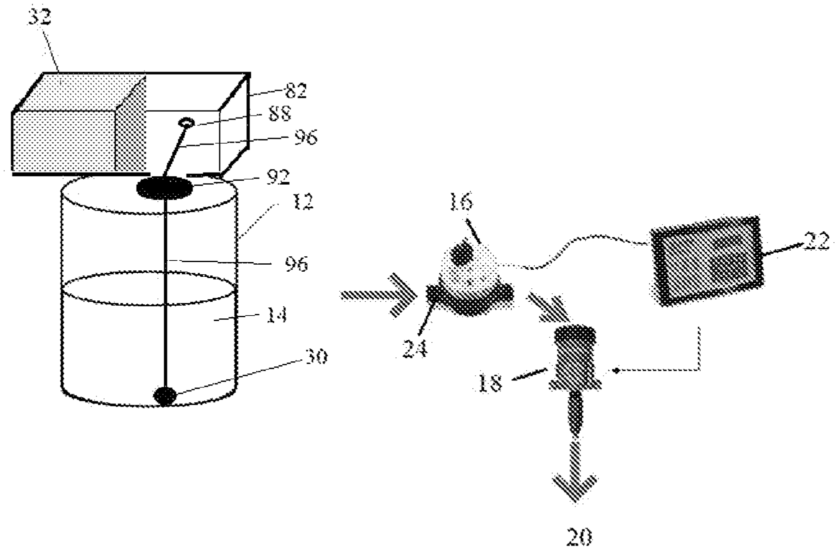

FIG. 6*b* shows schematically the apparatus 80 attached to a fertigation system to provide a fertigation system of the present invention for supplying accurate amounts of liquid fertilizer. The apparatus container 80 is shown attached to the top of the tank 12 and the at least one measurement device 30 is installed in the tank 12.

The attached apparatus 80 provides a fertigation system featuring an electronic liquid control unit 32 with at least one fluid measurement device 30 that measures the total volume of fertilizer 14 within a fertilizer tank 12. The one or more sensors 30 communicate with the electronic liquid control unit 32 and transmits thereto the sensed data regarding the volume of fertilizer 14 in the tank 12. The data may be transmitted to the electronic liquid control unit 32 via a communication device, for example a wired or a wireless communication using a transmitter, which can send data from the at least one sensor 30 to the electronic liquid control unit 32. The fertigation system further includes a counter 16 that communicates, such as via electric pulses with the electronic liquid control unit 32 unit regarding the volume of fertilizer 14 that passes through the counter 16. The electronic liquid control unit 32 calculates a corrected parameter, such as but not limited to the pulse duration or pulse number according to the data received from the one or more sensors 30 and the fertilizer counter 16 and transmits instructions to the controller 22. The instructions may be the corrected pulses. The controller commands at least one pump 18 to deliver an amount of fertilizer to fertigate land, such as a crop, accordingly.

The present invention may also provide a detection and alarm system for alerting a user when there is an unexplained volume of liquid in a storage container. The unexplained volume of liquid may be a loss of a volume of liquid, which is significantly more than the volume being pumped out, or which is measured at a time when no liquid is being pumped out. The loss of liquid may be due to a plurality of reasons, including, but not limited to, theft of the liquid, a leak in the storage container and damage to the storage container. In some embodiments, the unexplained volume may be too much liquid in the storage container, which may be a sign of a blockage in an outlet of the storage container. The apparatus may be the same as described in FIGS. 6*a* and 6*b*. The electronic liquid control unit may include software for analysis of liquid volume data to determine a volume, which is greater or lower than expected from scheduled pumping. The at least one measurement device may transmit data relating to the volume of liquid in the tank to the electronic liquid control unit. The volume of liquid data may be analyzed by the electronic liquid control unit and when the reading is above a normal range value at the time of pumping, or when the value of the volume is found to be changing at a time of no pumping, an alert may be logged. The alert may be signaled to a user. In some embodiments, the apparatus or system may include at least one camera and images may be received by the electronic liquid control unit and user, which in combination with the volume of liquid data may provide more details of the reason for the alarm. The system may provide a plurality of alerts and notifications, such as but not limited to movement detection, GPS reading and a need to fill the tank.

Figure 7:
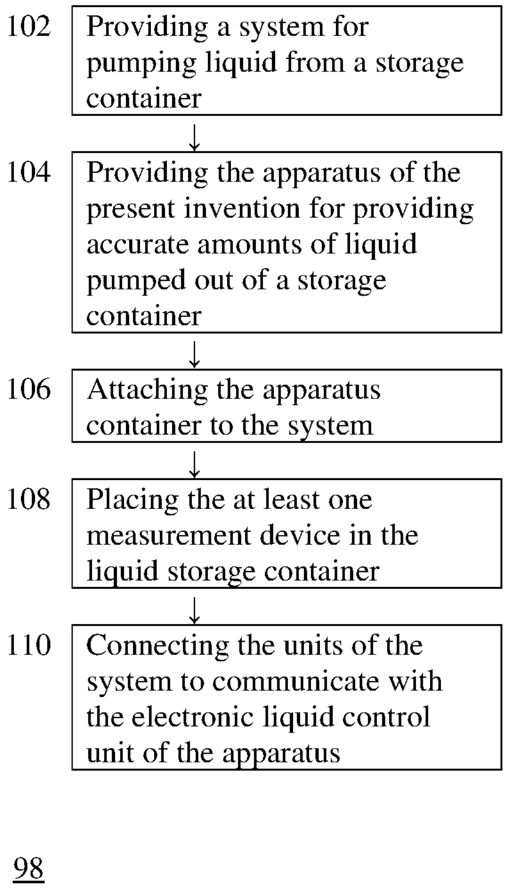
FIG. 7 shows a flow chart of an exemplary method of installation of an exemplary fertigation apparatus according to an aspect of the present invention.

The present invention provides a method 98 of assembling a system of the present invention for monitoring and providing accurate amounts of a liquid, such as, but not limited to a fertilizer as shown schematically in the flow chart of FIG. 7. The order of the steps is not meant to be limiting and any suitable order may be used. The method includes a step 102 of providing a system for pumping liquid from a storage container. The system may be a preexisting system, which is being updated with the apparatus of the present invention, or may be a new system, which includes the apparatus of the present invention. The system may include a storage container for storing a liquid, such as, but not limited to a fertilizer, at least one counter, a pump and a controller, the components as previously described herein. The apparatus of the present invention for providing accurate amounts of a liquid pumped out of a storage container, is provided in step 104. The amounts may be predetermined. The apparatus may feature an electronic liquid control unit and at least one fluid measurement device, such as, but not limited to a sensor, which may be configured to measure the total volume of fertilizer within a fertilizer tank. The one or more sensors are configured to communicate with the electronic liquid control unit and transmit thereto the sensed data regarding the volume of fertilizer in the tank.

The apparatus may be contained in a container, such as, but not limited to a box. Inside the box may be connected an electronic liquid control unit of the present invention as previously described. The box may include any suitable electronics, hardware and software to be used by the system. The box may include at least one measuring device for real time measurement of parameters relating to the volume of liquid, such as the fertilizer in the tank. In some embodiments, the at least one measurement device is a sensor, such as but not limited to a pressure sensor. The at least one measurement device may be connected to the apparatus container by a cable. The cable may be secured to the box in any suitable way, such that the at least one measurement device is freely moveable at the extremity of the cable to which it is attached and can be positioned out of the apparatus container. The apparatus container may be secured in any suitable way to the system 106. In some embodiments the apparatus container is attached to the top of the storage tank. The apparatus container may include any suitable attachment means, such as, but not limited to clips, magnets, screws and bolts, which may be used to attach to the storage tank or other part of the system. The apparatus container may include an opening through which the end of the cable with the at least one measurement device may be thread through. A user may thread the at least one measurement device through the opening. The at least one measurement device may be lowered into the storage container and placed at a suitable position, as in step 108. In some embodiments the at least one measurement device is positioned on the bottom floor of the storage container. The at least one measurement device may be placed in any suitable location of the storage container for accurate measurement of the volume of liquid stored therein. In some embodiments there is more than one at least one measurement device. Each at least one measurement device may be lowered to the same position or a different position about the storage container. The units of the system, such as the counter, the controller and the pump may be connected in any suitable way to connect and communicate with the electronic liquid control unit of the apparatus, as in step 110. In some embodiments, the electronic liquid control unit is connected to the counter using a wired or wireless connection. In some embodiments, the electronic liquid control unit is connected to the controller using a wired or wireless connection. In one non-limiting example of a preexisting fertigation system, which is being upgraded, the wired connection between the counter and the controller is cut. The same connection wires or other wires may then be used to connect the counter to the electronic liquid control unit and the electronic liquid control unit to the controller. The output, such as the pulses, that the counter previously transmitted to the controller will now be transmitted to the electronic liquid control unit and the electronic liquid control unit modulated output, such as the corrected pulses, may then be transmitted to the controller. In some embodiments the setup of the system may include providing the system with parameters, such as but not limited to the size and shape of the liquid container, the time intervals for measuring the volume of the liquid and the calibration volume per pulse of the counter.

Figure 8:
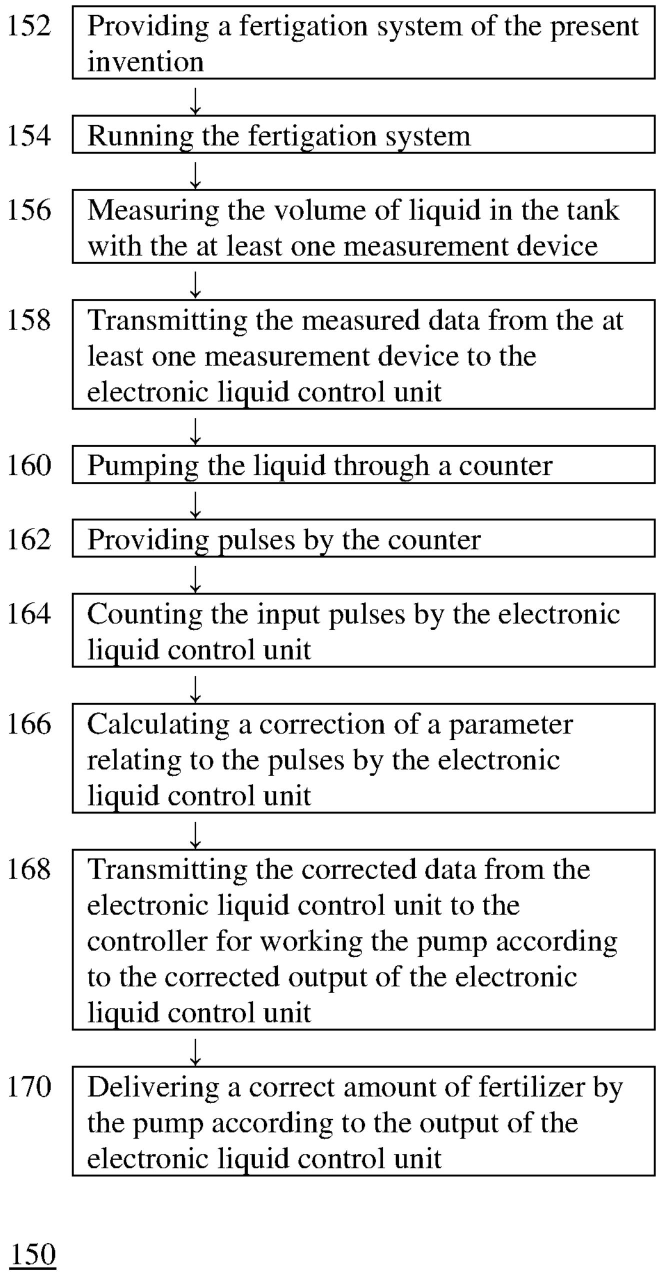
FIG. 8 shows a flow chart of an exemplary method of use of an exemplary fertigation system according to an aspect of the present invention.

The system of the present invention can be used to measure, monitor and control the quantity and specific gravity of liquids supplied from a storage container such as, but not limited to the volume of fertilizers supplied to an irrigation device, for delivering the fertilizer to crops and for precise crop fertigation. FIG. 8 shows a flow chart of an exemplary method 150 which makes use of an exemplary system, such as a fertigation system according to an aspect of the present invention. The order of the steps is not meant to be limiting and any suitable order may be used. The fertigation system of the present invention as hereinbefore described is provided in step 152. The system is switched on and runs to provide fertilizer to a destination, such as, but not limited to a field of crops, as in step 154. At least one measurement device positioned in the fertilizer storage tank measures the volume of fertilizer in the tank, as in step 156. The at least one measurement device measures the volume at the start of a time period and at the end of a time period. In one embodiment the measurement is done before the pump is started and after it is stopped. In another embodiment the measurement is done at the successive start and end of predetermined time periods during the pumping process. Other parameters relating to the stored liquid may also be measured. The at least one measurement device may be configured to measure a parameter constantly, or at fixed intervals, or in set periods. The at least one measurement device may be configured to measure a parameter when the pump is working and when it is not working. At step 158, the data relating to the fertilizer and to the volume of the fertilizer is transmitted to the electronic liquid control unit. The data may be transmitted during the pumping process and when the pump is not working. The fertilizer is pumped out of the tank and passes via a counter, as in step 160. At step 162, the counter provides pulses, such as electrical pulses. The pulses are transmitted to and counted by the electronic liquid control unit, as in step 164. A correlation may be made between the volume of fertilizer passing through the counter and a measured pulse. In one non-limiting example, the counter may be configured to provide one pulse per liter of liquid passing through the counter. However, as previously described, the calibration of the counter in practice is typically inaccurate. The number of pulses counted from the start of the pumping until the pumping is stopped is measured. The number of pulses may be counted during each time period where the volume of liquid is measured. The duration of a pulse may be measured. It may be measured for example by a timer in the electronic liquid control unit. The counter may be coupled with the electronic liquid control unit to communicate the pulses and any other data relating to the pulses. The electronic liquid control unit may at step 166 calculate a correction of a parameter relating to the pulses by employing a set of equations and algorithms of the present invention and using the data from the one or more measurement devices and the counter. The correction factor may be used in different ways to facilitate corrected data for pumping of the right amount of fertilizer and fertigation with an accuracy of up to 100%. In one embodiment the correction or recalibration for providing the right amount of fertilizer may be by for example, but not limited to changing the duration of the electric pulses as shown schematically in FIG. 9. In one embodiment the correction or recalibration for providing the right amount of fertilizer may be by for example, but not limited to changing the number of pulses as shown schematically in FIG. 10.

Figure 9:
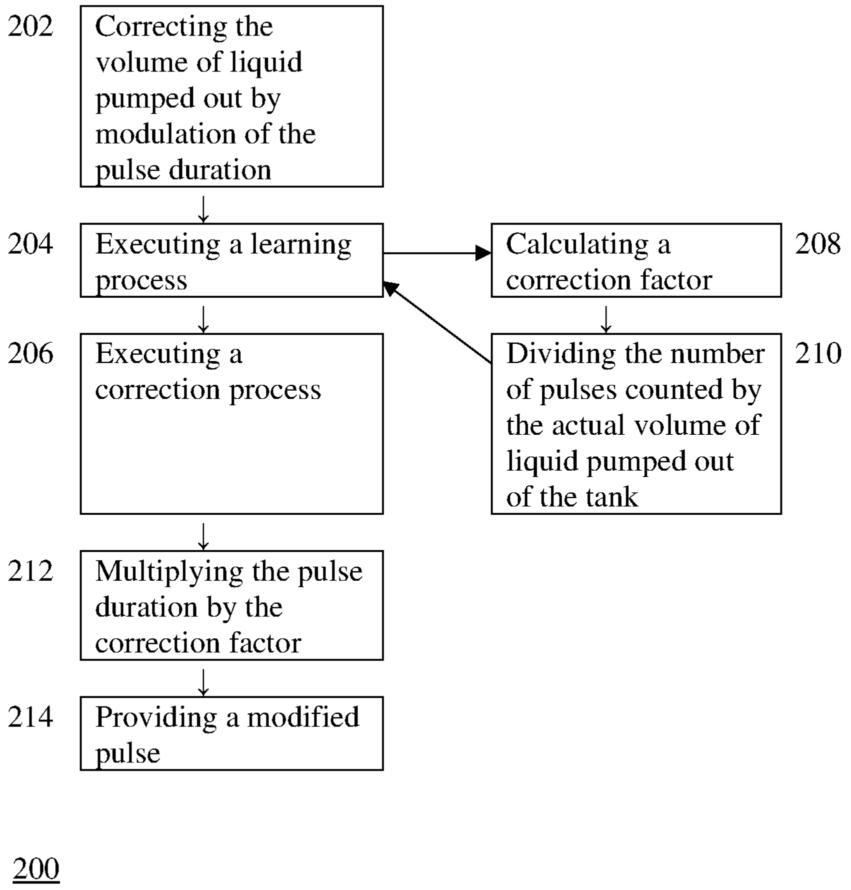
FIG. 9 shows a flow chart of an exemplary method of use of the system of the present invention employing modulation of the pulse duration according to an aspect of the present invention.

FIG. 9 shows a flow chart of an exemplary method of correction to provide a correct volume of liquid 200 according to an aspect of the present invention. The order of the steps is not meant to be limiting and any suitable order may be used. In some embodiments the method employs modulation of the pulse duration 202. The correction of the system may include a plurality of processes and steps. The correction of the system may include a learning process 204 and a correction process 206. The learning process may calculate a correction factor 208. The learning process may be done by an algorithm of the electronic liquid control unit. It may employ measurements such as, but not limited to the tank's initial volume of liquid, the tank's final volume of liquid and the number of pulses measured by the counter. In some embodiments, the pump may be started. In some embodiments, the correction factor may be calculated by dividing the number of pulses by the actual measured volume of liquid pumped out of the tank 210. The correction process may correct the pulse duration. The modulated pulse duration may be calculated by an algorithm of the electronic liquid control unit which multiplies the measured pulse duration by the correction factor 212. The electronic liquid control unit provides a modified, corrected pulse duration 214. The corrected pulse duration if longer than the unmodified pulse duration may provide more fertilizer pumped out per pulse and a pulse duration of less than the measured unmodulated pulse duration may facilitate less fertilizer being pumped out per pulse.

Figure 10:
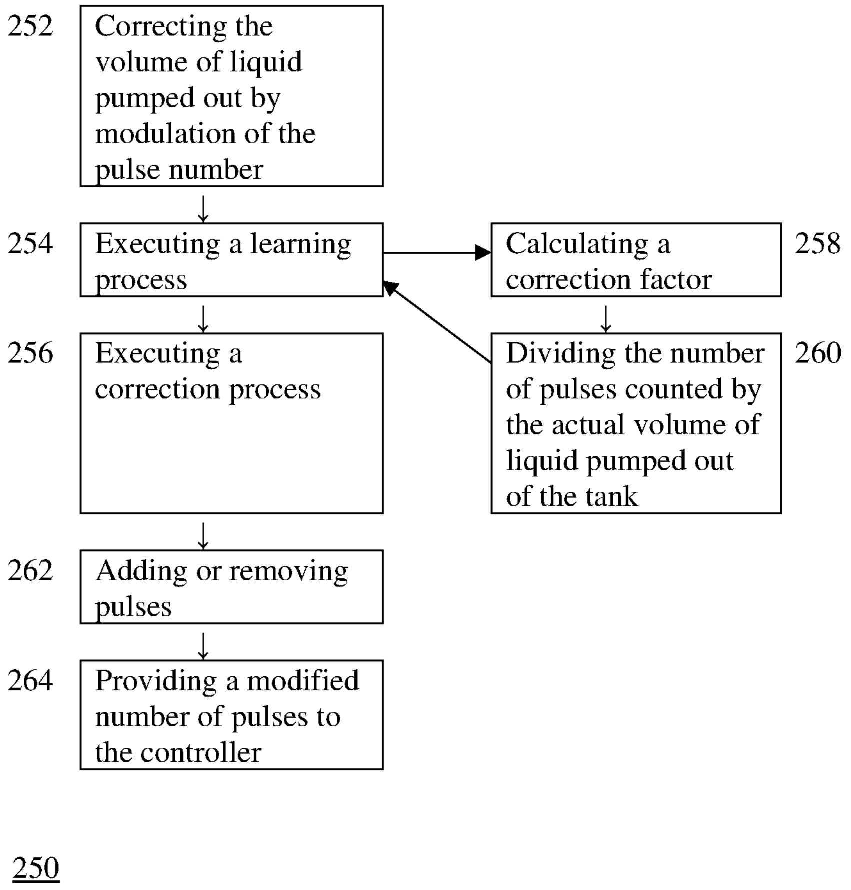
FIG. 10 shows a flow chart of an exemplary method of use of the present invention employing modulation of the number of pulses according to an aspect of the present invention.

FIG. 10 shows a flow chart of an exemplary method of correction to provide a correct volume of liquid 250 according to an aspect of the present invention. The order of the steps is not meant to be limiting and any suitable order may be used. In some embodiments the method employs modulation of the number of pulses 252. The correction of the system may include a plurality of processes and steps. The correction of the system may include a learning process 254 and a correction process 256. The learning process may calculate a correction factor 258. The learning process may be done by an algorithm of the electronic liquid control unit. It may employ measurements such as, but not limited to the tank's initial volume of liquid, the tank's final volume of liquid and the number of pulses from the counter measured by the electronic liquid control. In some embodiments, the pump may be started. In some embodiments, the correction factor may be calculated by dividing the number of pulses by the actual measured volume of liquid pumped out of the tank 260. The correction process may modulate the number of pulses to provide a corrected number of pulses. The correction process may employ data such as, but not limited to the number of pulse packets and the length of a pulse packet, which may be calculated. The number of pulse packets may be determined by deducting the value of the actual measured volume pumped out from the value of the desired volume to be pumped out. If the value is not an integer, but includes a fraction, the fraction is deducted from the integer and the value of the integer is the number of pulse packets. If the value includes a fraction, the fraction may be divided by the number of pulse packets and the divided portion stored in a special accumulator of the electronic liquid control unit. The packet length is determined by dividing the desired volume of pumped out liquid by the number of pulse packets.

Depending on the correction factor, modulation of the pulse number may be at least one of adding at least one pulse to a packet, removing at least one pulse from a packet, adding at least one pulse between packets and removing at least one pulse between packets as required 262. When the correction factor is less than 1, pulses may be added to a packet and when the correction factor is more than 1, pulses may be removed from a packet. The addition of a pulse results in less volume being pumped out per pulse and this is done when it is determined that this is needed according to the value of the correction factor. The removal of a pulse results in more volume being pumped out per pulse, which is done when it is determined that this is needed according to the value of the correction factor. Addition or removal of pulses compensates for the inaccurate counter to provide accurate volumes of liquid pumped out of the tank. The correction output of the electronic liquid control unit may include the number of pulses to be added to or removed from a pulse packet 264. The correction output of the electronic liquid control unit may also include a pulse to be added to or removed from the pulse number when the stored portions have accumulated to add up to one.

Referring back to FIG. 8, the electronic liquid control unit is coupled to the controller and the corrected data may be transmitted to the controller for working the pump according to the correction output of the electronic liquid control unit 168. In an example wherein the pulse duration has been modified, the controller receives the pulse with the modified pulse duration according to the output from the electronic liquid control unit. In an example wherein the pulse number is modified, the controller receives the pulses which have been modulated by the electronic liquid control unit to add or delete a pulse at a suitable time during each pulse packet, such as, but not limited to deleting the last pulse in a packet or adding a pulse at the end of the pulse packet. The pump may deliver the amount of fertilizer accordingly 170.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for providing liquid, the system comprising:

at least one measurement device for measuring a volume of liquid in a liquid tank; and an electronic liquid control unit in communication with the at least one measurement device; the electronic liquid control unit is further in communication with at least one counter through which the liquid is pumped out of the tank and a controller configured for actuating the pump to expel liquid out of the tank, wherein said electronic liquid control unit is configured to actuate the pump to expel liquid from the tank for delivering an amount of the liquid according to an output of the electronic liquid control unit, wherein the at least one counter provides a plurality of spaced apart pulses, each pulse of the plurality of pulses having a pulse duration and the electronic liquid control unit is configured to count the pulses, wherein the electronic liquid control unit calculates a data output comprising a correction factor calculated by dividing the number of counted pulses by the actual measured volume of liquid pumped out of the tank in the same period the pulses were counted, wherein the data output from the electronic liquid control unit comprises at least one of:

a corrected pulse duration calculated by multiplying the measured pulse duration by the correction factor, the corrected pulse duration employed to increase or decrease the duration of a pulse for facilitating a precalculated amount of liquid to be expelled out of the tank per pulse;

a corrected pulse number employed to provide an additional at least one pulse or removal of at least one pulse.

2. The system of claim 1, wherein the at least one measurement device includes at least one sensor, wherein the at least one sensor comprises a pressure sensor.

3. The system of claim 1, wherein the electronic liquid control unit analyzes the data from at least one measurement device and the data from the counter and outputs data that allows accurately actuating the pump.

4. The system of claim 3, wherein accurately actuating the pump comprises providing a calculated volume of liquid per counted pulse and providing a calculated volume of liquid from the tank to the irrigation device.

5. The system of claim 1, wherein removal of at least one pulse results in a greater volume being pumped out per counted pulse and wherein addition of at least one pulse results in a smaller volume being pumped out per counted pulse.

6. The system of claim 1, wherein the plurality of pulses are divided into a plurality of packets of pulses, wherein the number of packets of pulses is calculated by deducting the actual measured volume pumped out from the tank from the desired volume and defining the number of pulse packets according to the integer value of the result and storing any remaining fraction in an accumulator and wherein each packet includes a number of pulses, the number calculated by dividing the desired volume to be pumped out of the tank by the integer value of the number of pulse packets.

7. The system of claim 6, wherein the electronic liquid control unit comprises an accumulator for storing the value of the remaining fraction of pulses and wherein the remaining fraction is divided by the number of pulse packets, the divided amount to be stored at the end of each pulse packet.

8. The system of claim 1, wherein the liquid comprises a liquid fertilizer, wherein the system further comprising an irrigation device for delivering the fertilizer to at least one of a crop, earth, field, flowers, or plant, and wherein the system is configured to continuously monitor the amount of fertilizer delivered to a plant.

* * * * *